United States Patent
Jang et al.

(10) Patent No.: US 6,803,174 B2
(45) Date of Patent: Oct. 12, 2004

(54) METHODS FOR FORMING A PHOTOSENSITIVE INSULATING FILM PATTERN AND REFLECTION ELECTRODE EACH HAVING AN IRREGULAR UPPER SURFACE AND METHOD FOR MANUFACTURING A LCD HAVING REFLECTION ELECTRODE USING THE SAME

(75) Inventors: Yong-Kyu Jang, Suwon-si (KR); Jae-Hyun Kim, Daegn Kwangyeoksi (KR)

(73) Assignee: Samsung Electronics Co., Ltd., Suwon (KR)

( * ) Notice: Subject to any disclaimer, the term of this patent is extended or adjusted under 35 U.S.C. 154(b) by 167 days.

(21) Appl. No.: 10/190,628

(22) Filed: Jul. 9, 2002

(65) Prior Publication Data

US 2003/0039925 A1 Feb. 27, 2003

(30) Foreign Application Priority Data

Aug. 18, 2001 (KR) .................................. 2001-0049749

(51) Int. Cl.⁷ .......................... G02F 1/1335; G03F 7/20
(52) U.S. Cl. ........................ 430/321; 430/319; 430/325
(58) Field of Search ................................. 430/321, 319, 430/324, 322, 325, 396; 349/113

(56) References Cited

FOREIGN PATENT DOCUMENTS

JP          2000-250025 A    *  9/2000

* cited by examiner

Primary Examiner—John A. McPherson
(74) Attorney, Agent, or Firm—McGuireWoods, LLP

(57) ABSTRACT

Disclosed is a method for forming a photosensitive insulating film pattern and a reflection electrode each having an uneven upper surface, and a method for manufacturing an LCD having a reflection electrode using the same. A photosensitive insulating film is formed on a first substrate on which a first electrode having a reflection property is formed. The photosensitive insulating film is exposed to a light. The exposed photosensitive insulating film is developed to form an uneven surface with prominences and recesses. The reflection electrode is formed on the photosensitive insulating film. A second substrate having a transparent electrode is formed to face the first substrate. A liquid crystal layer is sandwiched between the first substrate and the second substrate. A first amount of light of the light scanned between first patterns corresponding to an upper portion of the first electrode is smaller than a second amount of light thereof scanned between second patterns corresponding to a portion other than the first electrode. The dents or grooves formed at the photosensitive insulating film and the entire surface of the reflection electrode formed on the photosensitive insulating film have the same depth, to thereby improve the reflection efficiency throughout the entire area of the display region.

17 Claims, 17 Drawing Sheets

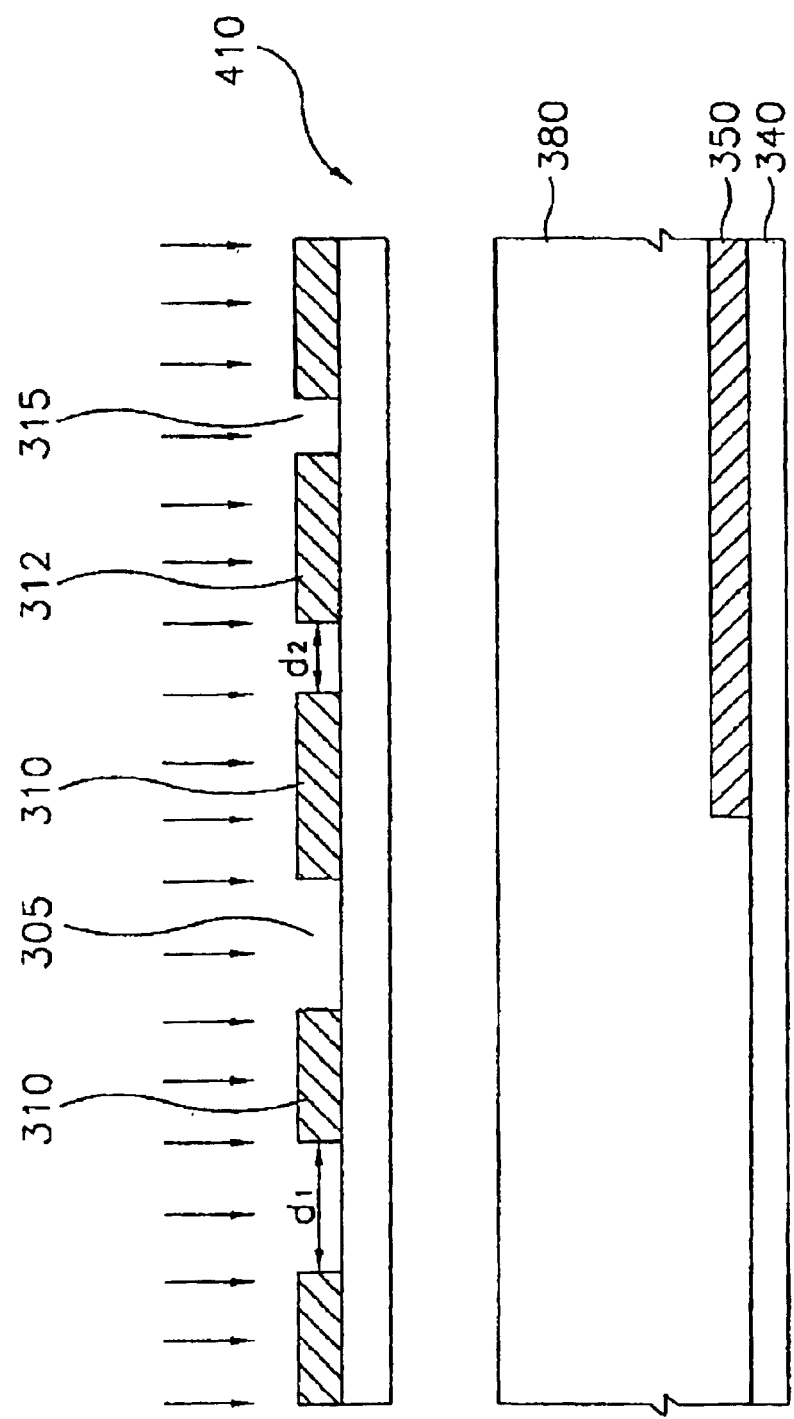

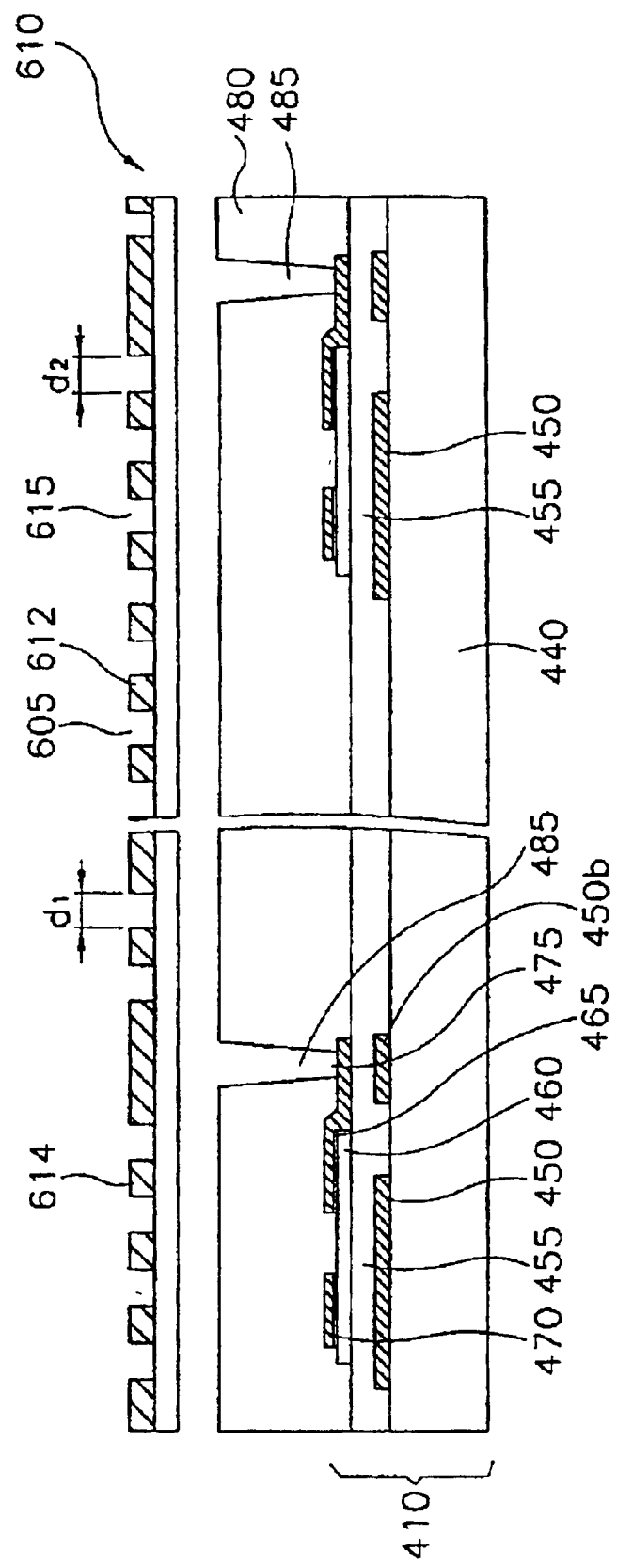

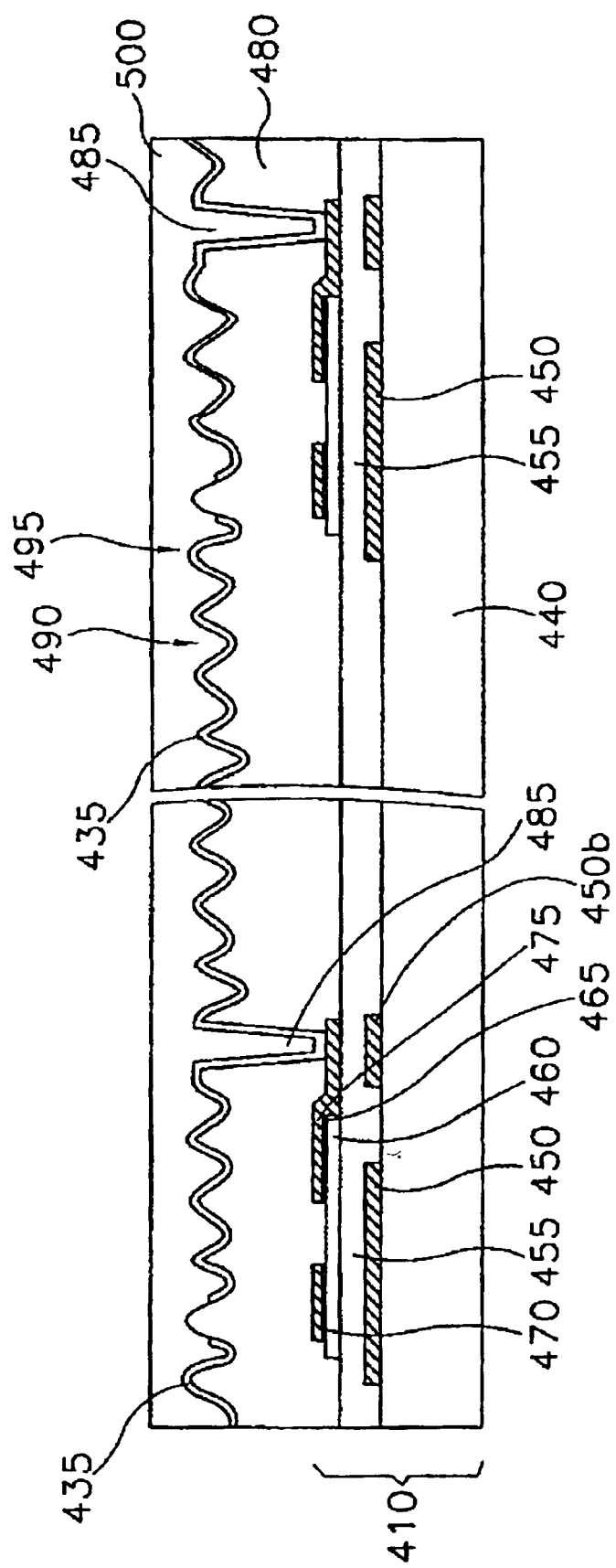

METHODS FOR FORMING A PHOTOSENSITIVE INSULATING FILM PATTERN AND REFLECTION ELECTRODE EACH HAVING AN IRREGULAR UPPER SURFACE AND METHOD FOR MANUFACTURING A LCD HAVING REFLECTION ELECTRODE USING THE SAME

BACKGROUND OF THE INVENTION

1. Field of the Invention

The present invention relates to methods for manufacturing a reflection type liquid crystal display (LCD) and a reflection and transmission composite type LCD, and more particularly, to methods for forming a photosensitive insulating film pattern and a reflection electrode each having an uneven upper surface, and a method for manufacturing a LCD having the reflection electrode using the same.

2. Description of the Related Art

In an information-oriented society these days, the role of an electronic display is becoming more important. All kinds of electronic displays are widely used in various industrial fields. As techniques of the electronic display field are continuously developed, various electronic displays having new functions are provided corresponding to diverse requirements of the information-oriented society.

Generally, an electronic display is an apparatus for visually transmitting information to a person. That is, an electronic display can be defined as an electronic apparatus, which converts an electrical information signal output from various electronic equipments into a visually recognizable optical information signal. Also, it may be defined as an electronic apparatus serving as a bridge for connecting the person and the electronic equipment.

These electronic displays are classified into an emissive display, in which the optical information signal is displayed by a light-emitting method, and a non-emissive display, in which the signal is displayed by an optical modulation method such as light-reflecting, dispersing and interference phenomena, etc. As the emissive display is called an active display, a CRT (cathode ray tube), a PDP (plasma display panel), an LED (light emitting diode) and an ELD (electroluminescent display), etc. may also be mentioned. As the non-emissive display is called a passive display, an LCD, an EPID (electrophoretic image display), etc. may also be mentioned.

The CRT has been used in an image display device such as a television receiver and a computer monitor, etc., over the longest period of time. The CRT has the highest market share in an aspect of displaying quality and economical efficiency, but it also has many disadvantages such as a heavy weight, a large volume and high power consumption.

Meanwhile, as various kinds of electronic devices are small-sized and lighter in weight, along with the solidification and lower voltage and lower driving power of the electronic devices due to rapid advancement of semiconductor technologies, there is requested a flat panel type display having slimmer and lighter properties as well as lower driving voltage and lower power consumption characteristics according to the novel environment.

Among variously developed flat panel type displays, the LCD is much slimmer and lighter than any other displays and it has lower driving voltage and lower power consumption. Also, the LCD has the displaying quality similar to that of the CRT. Therefore, the LCD is widely used in various electronic devices. Further, since the LCD can be easily manufactured, its application is becoming gradually wider.

The LCD is classified into a transmission type LCD, which displays an image using an external light source and a reflection type LCD, which displays the image using ambient lights instead of the external light source.

The reflection type LCD has an advantage in that it consumes less power and shows an excellent display outdoors as compared with the projection type LCD. Further, the reflection type LCD is thin and light because an additional light source such as a backlight apparatus is not necessary.

However, the current reflection type LCD has a dark screen and fails to show high definition and multicolor images. Therefore, the reflection type LCDs are restrictively employed for a product that requires a simple pattern display, such as numbers or simple characters.

To use a reflection type LCD for various electronic displays, a high definition and a multicolor display together with an enhanced reflection luminance are necessary. In addition, proper brightness, rapid response speed and enhancement of contrast are necessary.

In current reflection type LCDs, two technologies are combined for an enhancement of the brightness. One is enhancing the reflection efficiency of the reflection electrode, and the other is achieving an ultra high aperture ratio. Naofumi Kimura discloses a method of enhancing the reflection efficiency by forming bumps to a reflection electrode in U.S. Pat. No. 5,610,741, issued Mar. 11, 1997, entitled "Reflection Type Liquid Crystal Display Device with Bumps on the Reflector."

FIG. 1 is a partial plan view of the reflection type LCD device provided in the above U.S. Patent, and FIG. 2 is a sectional view of the reflection type LCD device of FIG. 1.

Referring to FIGS. 1 and 2, the reflection type LCD device is comprised of a first substrate 10, a second substrate 15 facing the first substrate 10 and a liquid crystal layer 20 interposed between the first and second substrates 10 and 15.

The first substrate 10 includes a first insulating substrate 30 on which a plurality of gate bus wirings 25 is formed. Gate electrodes 35 branch off from the gate bus wirings 25. Additionally, a plurality of source bus wirings 40 are provided so as to be orthogonal with and maintain the insulation from the plurality of gate bus wirings 25 due to an insulating layer between the source bus wirings 40 and the gate bus wirings 25. Source electrodes 45 branch off from the source bus wirings 40.

Reflection electrodes 50 are formed between the first substrate 10 and the liquid crystal layer 20 and are disposed in a plurality of rectangular regions formed by crossing the plurality of gate bus wirings 25 and the plurality of source bus wirings 40.

The reflection electrode 50 is connected with a thin film transistor (TFT) device 55 formed on the first substrate 10, the TFT device 55 serving as a switching device with the gate bus wiring 25 and the source bus wiring 40.

A plurality of dents 70 and 71 are provided on the surface of the reflection electrode 50, whereby the surface is made bumpy. The plurality of dents 70 and 71 are irregularly arranged on the entire surface as depicted in FIG. 1. The reflection electrode 60 and a drain electrode of the TFT device 55 are connected to each other through a contact hole 65.

The gate bus wiring 25 and the gate electrode 35 are formed on the first insulating substrate 30 made of, for example, glass by depositing tantalum (Ta) film using a sputtering method and patterning the deposited Ta film using an etching or a photolithography process.

Next, the gate insulating film 75 is formed to cover the gate bus wiring 25 and the gate electrode 35. The gate insulating film 75 is made, for example, by forming a 4000 Å thick SiNx film by a plasma CVD (Chemical Vapor Deposition) method.

Referring to FIG. 2, a semiconductor layer 80 of amorphous silicon (a-Si) is formed on the gate insulating layer 75 on the gate electrode 35. Contact layers 85 and 90 of n+ type impurities-doped a-Si layer are formed on the semiconductor layer 80.

Subsequently, molybdenum (Mo) film is formed on the first insulating substrate 30 to cover those members formed in the above-mentioned manner and then the Mo film is patterned to form a source bus wiring 40, a source electrode 45 and a drain electrode 60. In such a manner, a TFT device 55 including the gate electrode 35, the semiconductor layer 80, the contact layers 85 and 90, the source electrode 65 and the drain electrode 60 is completed.

On the entire surface of the insulating substrate 30 in which the TFT element 55 was formed, an organic insulating film 95 and a reflection electrode 50 each having a bumpy surface are sequentially formed.

FIGS. 3A and 3B are sectional views showing the steps of a method for forming bumps in the device shown in FIG. 2.

Referring to FIG. 3A, a resist film 100 is formed on the surface of the first insulating substrate 30 by a spin coating method to cover the metal pattern 55 of aluminum (Al) or nickel (Ni) with a high reflectivity. The metal pattern 55 includes, for example, the source electrode, the drain electrode or the storage electrode for the TFT. Thereafter, the resist film 100 is pre-baked.

Next, a mask 110, where a light transmitting region 105 and a light shielding region 106 are formed in a predetermined pattern, is arranged over the coated resist film 100 and then exposure and development processes are carried out so that bumps 115 corresponding to the pattern of the mask 110 are formed as shown in FIG. 3B. When a thermal treatment of the substrate is carried out, a bump 115 whose angles are rounded off is formed.

Returning to FIG. 2 again, an organic insulating film 95 is applied to cover the bumps 115, for example, by the spin coating method and thereby the surface of the formed organic insulating film 95 becomes bumpy due to the bumps 115.

Subsequently, in the reflection type LCD as shown in FIG. 2, the organic insulating film 95 is patterned using a mask (not shown) to form a contact hole 65 exposing a surface of the drain electrode 60 of the TFT device 55. The contact hole 65 is filled with the reflection electrode material. The reflection electrode material is formed by the vacuum deposition method. Resultantly, dents 70 and 71 are formed in the surface of the reflection electrode 50 such that they have shapes corresponding to those of the organic insulating film 95.

Afterwards, a first orientation film 120 is formed on the reflection electrode 50 and the inorganic insulating layer 95, whereby the first substrate 10 is completed.

The second substrate 15 includes a second insulating substrate 140 on which color filters 125, a common electrode 130 and a second orientation film 135 are formed.

The second insulating substrate 140 is made of glass. Color filters 125 corresponding to the unit pixels are formed on the second insulating substrate 140. On the color filters 125 is formed a common electrode 130 made of a transparent material such as indium tin oxide (ITO). A second orientation film 135 is formed on the common electrode 130, whereby the second substrate 15 is completed.

The second substrate 15 is arranged to face the first substrate 10 and then the liquid crystal layer 20 including a liquid crystal material 21 and a pigment 22 is injected into a space between the first substrate 10 and the second substrate 15 by a vacuum injection method, whereby the reflection type LCD is completed.

Another conventional method for forming the aforementioned bumpy structure is to use a photosensitive organic insulating film. This method enables formation of the insulating layer with the bumpy surface structure only by using one kind of material layer instead of using the two layers of the resist film 100 and the organic insulating film 95 as explained in FIGS. 2, 3A and 3B. In other words, the photosensitive organic insulating film is coated instead of the resist film 100 shown in FIG. 3A. A conventional photolithography process against the photosensitive organic insulating film is carried out, whereby bumps, dents and the contact hole are formed. Thereafter, the resultant substrate is transferred into a subsequent process of the reflection electrode forming process.

However, according to the conventional methods of manufacturing the reflection type LCD, although the plurality of dents formed in the reflection electrode increase the reflection efficiency, they causes some problems as follows.

Referring to FIGS. 3A and 3B, in the above method, an irregular surface structure including the bumps 115 and the dents 117 is formed on a surface of the resist film 100 before the reflection electrode is formed. Then, since the patterns 57 such as the source electrode, the drain electrode and the storage capacitor electrode formed at a lower portion of the resist film 100 in a unit pixel region, is formed of the metal having a high reflectivity, and a space $d_2$ between the light shielding patterns 112 of the mask 110 on the metal pattern 57 is the same as a space $d_1$ between the light shielding patterns 112 of the mask on a portion in which the metal pattern 57 is not located, the light 83 is reflected upwardly from the upper surface of the metal pattern 57 during the exposing process for forming the dents 117. Therefore, as shown in FIGS. 3B and 4, the dent 117 having a diameter larger than a desired diameter is formed on the resist film 100, or it is exposed more deeply to the light than other portions. Worst of all, the dent portion is completely exposed to the light, so that an undesired portion is exposed.

In order to prevent the exposing problem of the undesired portion, an insulating film has to be further formed at a lower portion of the resist film 100. Therefore, the manufacturing process is more complicated and also the manufacturing cost is increased.

In addition, according to the aforementioned conventional reflection type LCD, the hemispherical dents as the microlenses, each of which has a different size, are formed so as to increase the reflection efficiency. However, a ridge portion (i.e., bumps) where the dents are not formed in the reflection electrode has a different size depending on its position. Therefore, there is a problem in that the uniformity of the reflectivity of the entire reflection electrode is deteriorated. That is, since the sizes of the portions in which the dents are not formed are different, respectively, the regions in which the sizes of the dents formed on the reflection electrode are different, respectively have different heights. Thus, since the reflection electrode has a different reflectivity depending on the regions, the uniformity in the reflectivity of the reflection electrode is deteriorated. As described above, the deterioration in the reflection uniformity of the reflection electrode causes orientation of the liquid crystal material to be non-uniform, so that a contrast of an image is degenerated. Further, there is a high probability that the non-uniformity of the orientation of the liquid crystal material generates a fog failure as well as an afterimage due to leaked light.

In an actual manufacturing process, since the sizes of the dents formed in the reflection electrode and the sizes of the regions between the dents are different from each other, there is a disadvantage in that it is substantially very difficult to precisely control the sizes of the dents and the spaces between the dents in accordance with design values.

Moreover, although the dents having the different sizes are formed to be overlapped with each other, since they have a hemispherical shape, it is very difficult to completely prevent scattered reflection of the incident light at the dents portion. Therefore, there is a limitation to improve the quality of the image.

Also, the conventional reflection type LCD basically has a foursquare pixel shape. However, as a great variety of information communication equipment, such as a portable cellular phone and an LCD TV, etc., are developed recently, various pixel sizes are requested. If a pixel having a desired size has to be applied to a display device requiring a different pixel size, the display device should be redesigned from the beginning. Also, there is a problem that a condition of the manufacturing process has to be secured again. Particularly, in case of an electronic display device such as the portable cellular phone, which is required to have a high reflectivity in a specific direction, it is further difficult to apply the pixel having the foursquare shape.

SUMMARY OF THE INVENTION

Therefore, it is a first object of the present invention to provide a method for forming a photosensitive insulating film having an uneven surface of uniform prominences and recesses.

It is a second object of the present invention to provide a method for forming a reflection electrode film having an uneven surface of uniform prominences and recesses (or protrusions and dents).

It is a third object of the present invention to provide a method for manufacturing an LCD having a reflection electrode that is especially suitable for manufacturing the LCD including the reflection electrode film having an uneven surface of uniform prominences and recesses.

It is a fourth object of the present invention to provide a method for manufacturing an LCD having a reflection electrode that has an uneven surface of uniform prominences and recesses for allowing the reflection electrode to have the same reflectivity throughout the entire region of the reflection electrode.

To achieve the first object of the present invention, there is provided a method for forming a photosensitive insulating film having an uneven surface of uniform prominences and recesses. In the above method, the photosensitive insulating film is formed on a substrate on which a first electrode having a reflection property is formed. The photosensitive insulating film is exposed to a light. The exposed photosensitive insulating film is developed. Here, a first light amount of the light scanned between first patterns corresponding to an upper portion of the first electrode is different from a second light amount thereof scanned between second patterns corresponding to a portion other than the first electrode.

To achieve the second object of the present invention, there is provided a method for forming a reflection electrode film having an uneven surface of uniform prominences and recesses. In the above method, a photosensitive insulating film is formed on a substrate on which a first electrode having a reflection property is formed. The photosensitive insulating film is exposed to a light. The exposed photosensitive insulating film is developed to form a surface film having an uneven surface of uniform prominences and recesses. The reflection electrode having an uneven surface corresponding to the surface of the photosensitive insulating film is formed on the photosensitive insulating film. Here, a first amount of light scanned between first patterns corresponding to an upper portion of the first electrode is different from a second amount of light thereof scanned between second patterns corresponding to a portion other than the first electrode.

Further, to achieve the third and fourth objects of the present invention, there is provided a method for manufacturing an LCD. In the above method, a photosensitive insulating film is formed on a first substrate on which a first electrode having a reflection property is formed. The photosensitive insulating film is exposed to a light. The exposed photosensitive insulating film is developed to form an uneven surface with uniform prominences and recesses. The reflection electrode is formed on the photosensitive insulating film. A second substrate having a transparent electrode facing the first substrate is formed. A liquid crystal layer is sandwiched between the first substrate and the second substrate. Here, a first amount of light scanned between first patterns corresponding to an upper portion of the first electrode is different from a second amount of light thereof scanned between second patterns corresponding to a portion other than the first electrode.

According to the present invention, dents (recesses) having a uniform width and depth are formed throughout the entire surface of a photosensitive film regardless of the existence of the metal pattern having a high reflectivity at the lower portion of the photosensitive insulating film and thereby a reflection type LCD with an improved reflection efficiency and remarkably improved contrast and picture quality compared with the conventional reflection type LCD can be realized. In addition, since the reflection electrode is formed using the improved exposing and developing process, the manufacturing time and costs are substantially reduced.

BRIEF DESCRIPTION OF THE DRAWINGS

The above objects and other advantages of the present invention will become more apparent by describing in detail preferred embodiments thereof with reference to the attached drawings, in which:

FIGS. 6A to 6C are cross-sectional views showing a method for forming the irregular surface of the reflection electrode according to a second embodiment of the present invention;

FIGS. 9A to 9D are cross-sectional views showing a method for manufacturing the LCD of FIGS. 7 and 8.

DETAILED DESCRIPTION OF THE PREFERRED EMBODIMENTS

Now, preferred embodiments of the present invention will be described in detail with reference to the attached drawings.

Embodiment 1

Figure 5A:
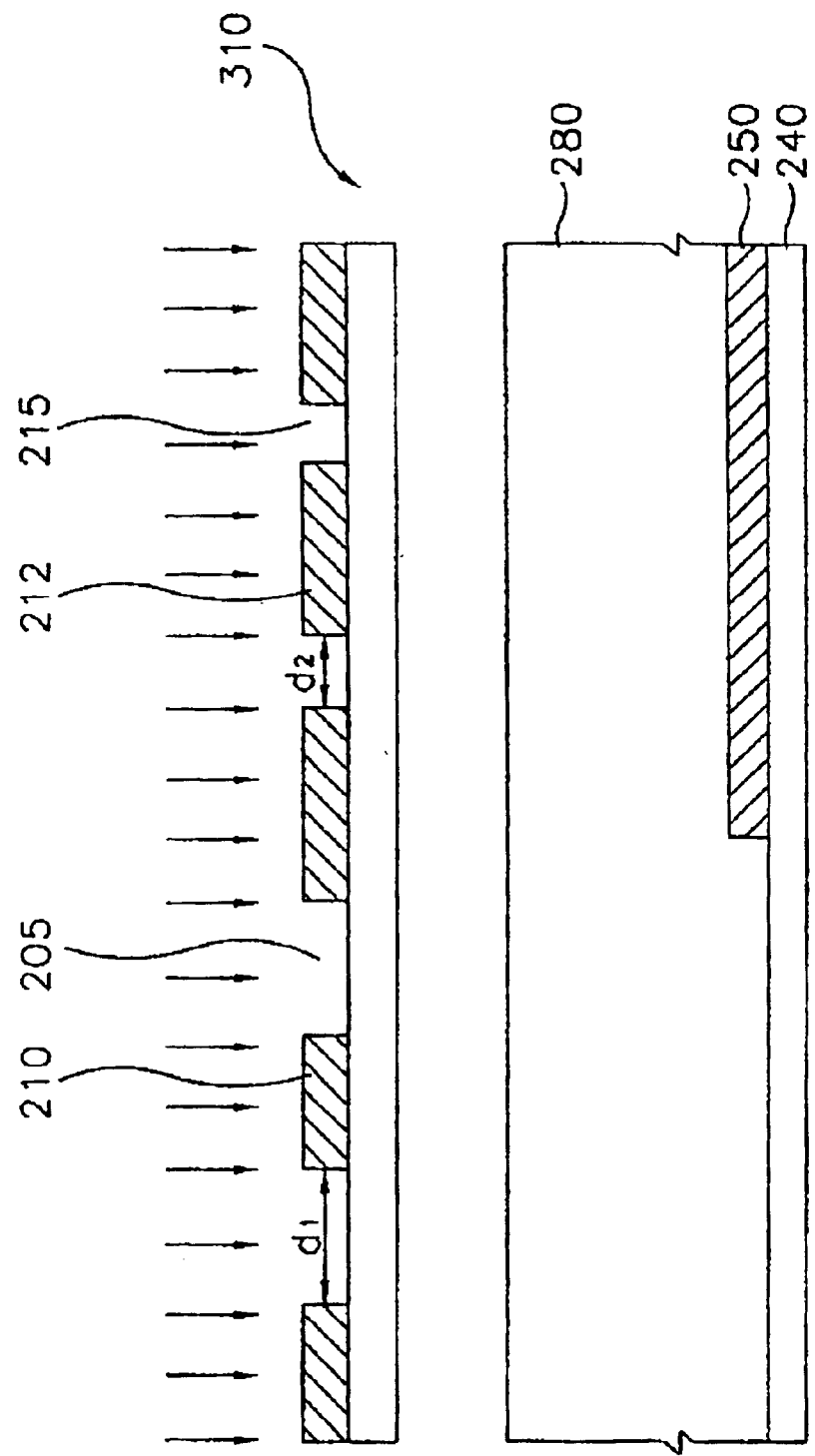
FIGS. 5A and 5B are cross-sectional views showing a method for forming a photosensitive insulating film having an irregular surface according to a first embodiment of the present invention.
Figure 5B:
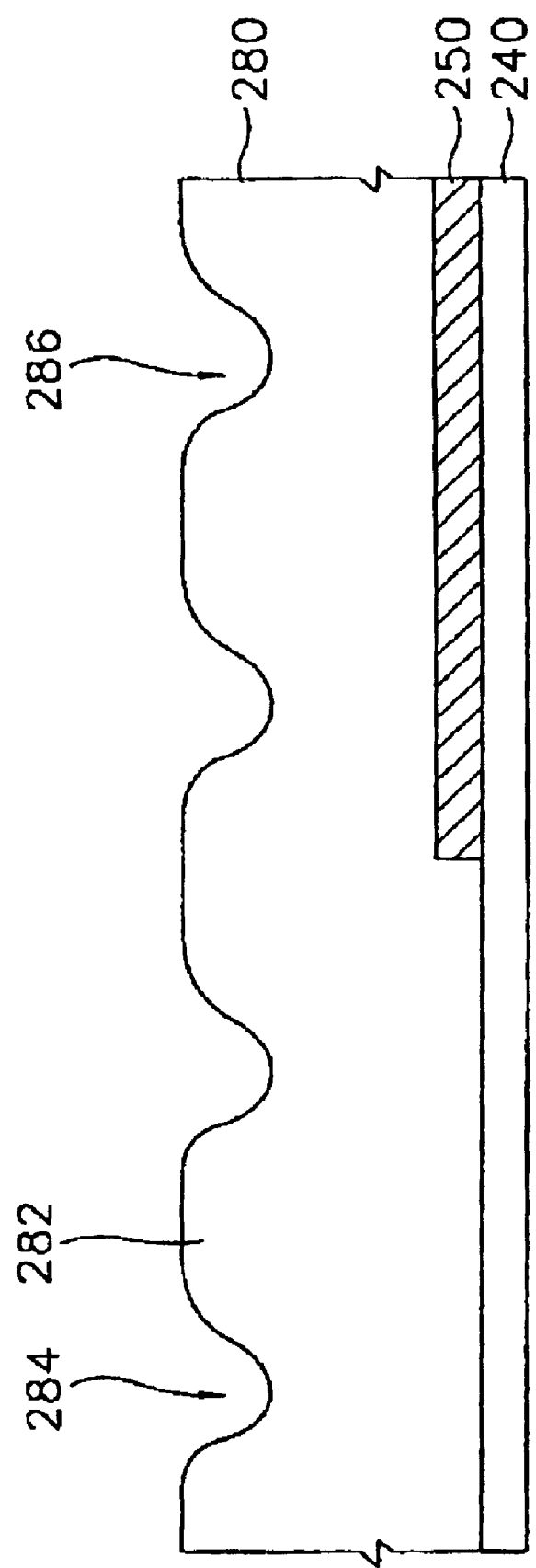

FIGS. 5A and 5B are partial cross-sectional views explaining a method for forming a photosensitive insulating film pattern having an uneven surface according to a first embodiment of the present invention.

Referring to FIG. 5B, a device having an uneven surface structure of a photosensitive insulating film pattern according to the present invention includes a substrate 240, a metal pattern 250 formed on the substrate 240, and a photosensitive insulating film 280 formed on the substrate 240 including the metal pattern 250.

The substrate 240 is made of a non-conductive material, i.e., an insulating material having a low reflectivity such as glass, ceramic, etc.

The metal pattern 250 is formed of a metallic material having a high reflectivity such as Al, Cr, Cu, W, Ta, Mo and Ti. The metal pattern 250 may have a double-layered structure in which a lower layer is made of Cr and an upper layer is made of Al.

A photosensitive insulating film 280 of a material, such as resist, is stacked on the substrate 240 on which the metal pattern 250 is formed. On an upper surface of the photoresist insulating film 280, there are formed dents (recesses) 284 and bumps (prominences or protrusions) 282 that are positioned relatively higher than the dents 284. That is, the photosensitive insulating film 280 has an upper surface having an uneven structure. The photosensitive insulating film 280 may include a photosensitive organic insulating film and a photosensitive inorganic insulating film.

Hereinafter, a method for forming the photosensitive insulating film pattern having the uneven surface will be described in detail with reference to the accompanying drawings.

Referring to FIG. 5A, on the substrate 240 formed of the insulating material such as glass or ceramic, etc., there is deposited a metal such as Ta, Ti, Mo, Al, Cr, Cu, W, etc. Then, the deposited metal is patterned to form the metal pattern 250. At this time, the metal pattern 250 may be formed of an aluminum alloy of Al—Cu or an alloy of Al—Si—Cu, containing aluminum.

Subsequently, on the substrate 240 including the metal pattern 250 is formed the photosensitive insulating film 280 to a thickness of about 1~3 μm by a spin coating method. At this time, the photosensitive insulating film 280 may be formed of a acrylic resin containing a photoactive compound (PAC).

Then, a mask 310 for forming the uneven surface structure is positioned over the photosensitive insulating film 280.

A second amount of light passing through a second portion, where the metal pattern 250 is located at a lower portion of the photosensitive insulating film 280, is less than a first amount of light passing through a first portion, where the metal pattern 250 is not located, such that the uneven structure formed at the upper surface of the photosensitive insulating film 280 has uniform prominences and recesses (i.e., a uniform profile).

As shown in FIG. 5A, in the mask 310 having light transmitting regions 205, 215 and light shielding patterns 210, 212, a space $d_2$ between the light shielding patterns 212 on the second portion corresponding to an upper portion of the metal pattern 250 is smaller by a desired proportion than a space $d_1$ between the light shielding patterns 210 corresponding to an upper portion of the first portion where the metal pattern 250 is not located. The proportion may be varied according to the reflectivity of the metal pattern 250. Preferably, the proportion is about ½.

Then, after the mask 310 is aligned over the photosensitive insulating film 280, the photosensitive insulating film 280 is exposed to a light by an exposing process, and then a development process is carried out. As a result, as shown in FIG. 5B, the plurality of dents (recesses) 284, 286 having a uniform width and depth are formed at the upper surface of the photosensitive insulating film 280. That is, the dent 286 formed at the portion where the metal pattern 250 is positioned has the same depth as the dent 284 formed at the portion that the metal pattern 250 is not positioned. Therefore, portions enclosed by the dents of the photosensitive insulating film 280 have a protrusion shape that is positioned relatively higher than the dents 284, 286. The prominences or protrusions have the same height.

Alternatively, the light amount of the second portion may be different from the light amount of the first portion, which is different from the method of FIG. 5A. In other words, the space $d_2$ between the light shielding patterns 212 of the second portion is the same as the space $d_1$ of the light shielding patterns 210 of the first portion and a half-tone mask, on which a semi-transparent film is additionally formed so as to reduce a transmitting amount of the incident light at the surface of the light transmitting region 215 of the second portion, is used. Then, the subsequent exposing process and developing process are performed in the same manner as above.

Embodiment 2

Figure 6B:
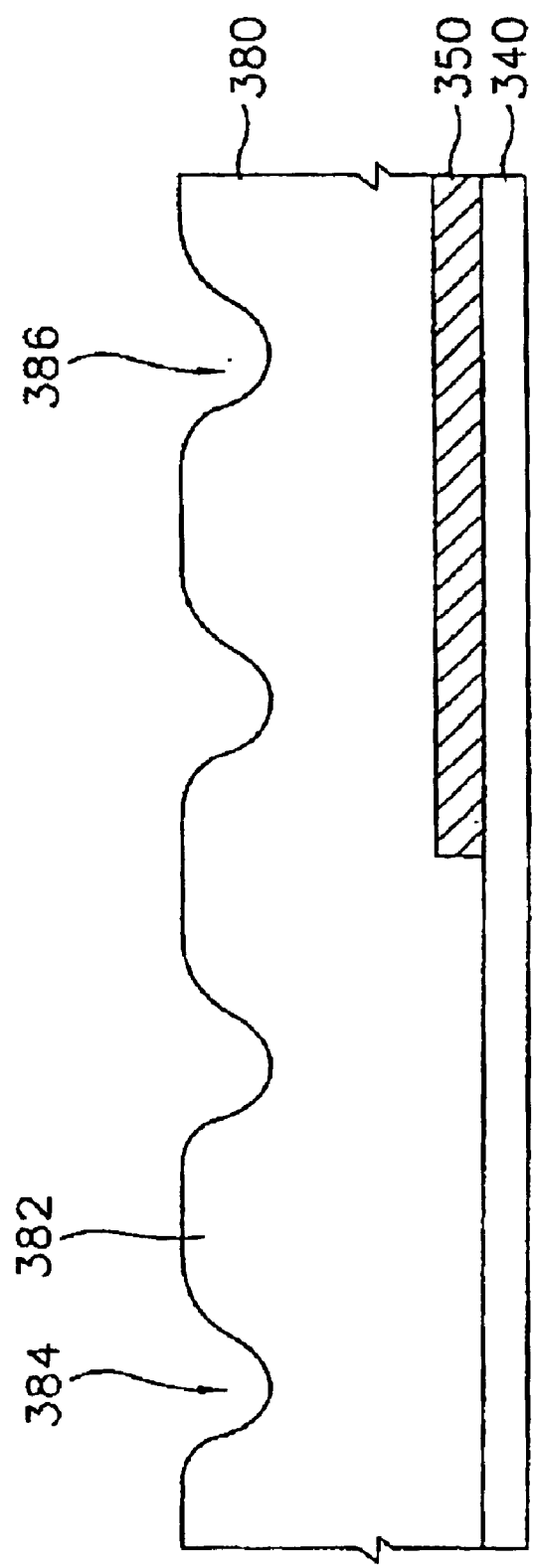
Figure 6C:
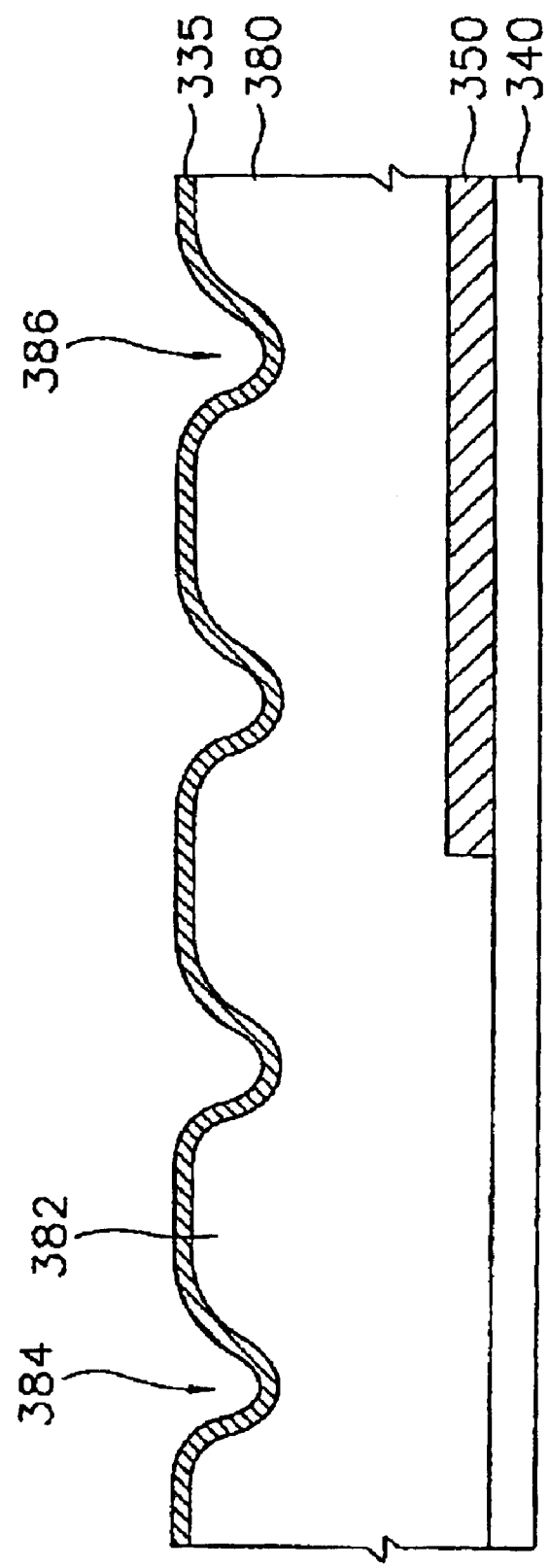

FIGS. 6A to 6C are cross-sectional views showing a method for forming the uneven surface of the reflection electrode according to a second embodiment of the present invention In this embodiment, a second amount of light passing through a second light transmitting region of the mask corresponding to dents in a second portion of a photosensitive insulating film 380 where a metal pattern 350 is positioned, is smaller than a first amount of light passing through a first light transmitting region of the mask corresponding to dents in a first portion of the photosensitive insulating film 380 where the metal pattern 350 is not positioned, in the same manner as in Embodiment 1.

Among the methods of the embodiments to meet the above condition, a method for forming the photosensitive insulating film having the uneven surface, as shown in FIGS. 6A and 6B, is the same as in Embodiment 1. Therefore, the description in this connection is intentionally omitted.

Referring to FIG. 6C, after the dents forming process of the photosensitive insulating film 380 that allows the second portion, where the metal pattern 350 having a high reflectivity is positioned, and the first portion where the metal pattern 350 is not positioned, have the same depth, is completed, a metallic material such as Al, Ni, Cr or Ag, etc., is deposited on the photosensitive insulating film 380 to a predetermined thickness using a sputtering method. Then, if necessary, the deposited metallic material is patterned in the form of the desired shape, whereby a reflection electrode 335 is formed. Here, the reflection electrode 335 has the same surface profile as in the photosensitive insulating located under the reflection electrode 335. In other words, the reflection electrode 335 has the profile comprised of dents 384, 386 having the same depth and protrusions 382 enclosed by the dents 384, 386. The protrusions 382 are positioned higher in the relative level than the dents 384, 386.

Embodiment 3

Figure 7:
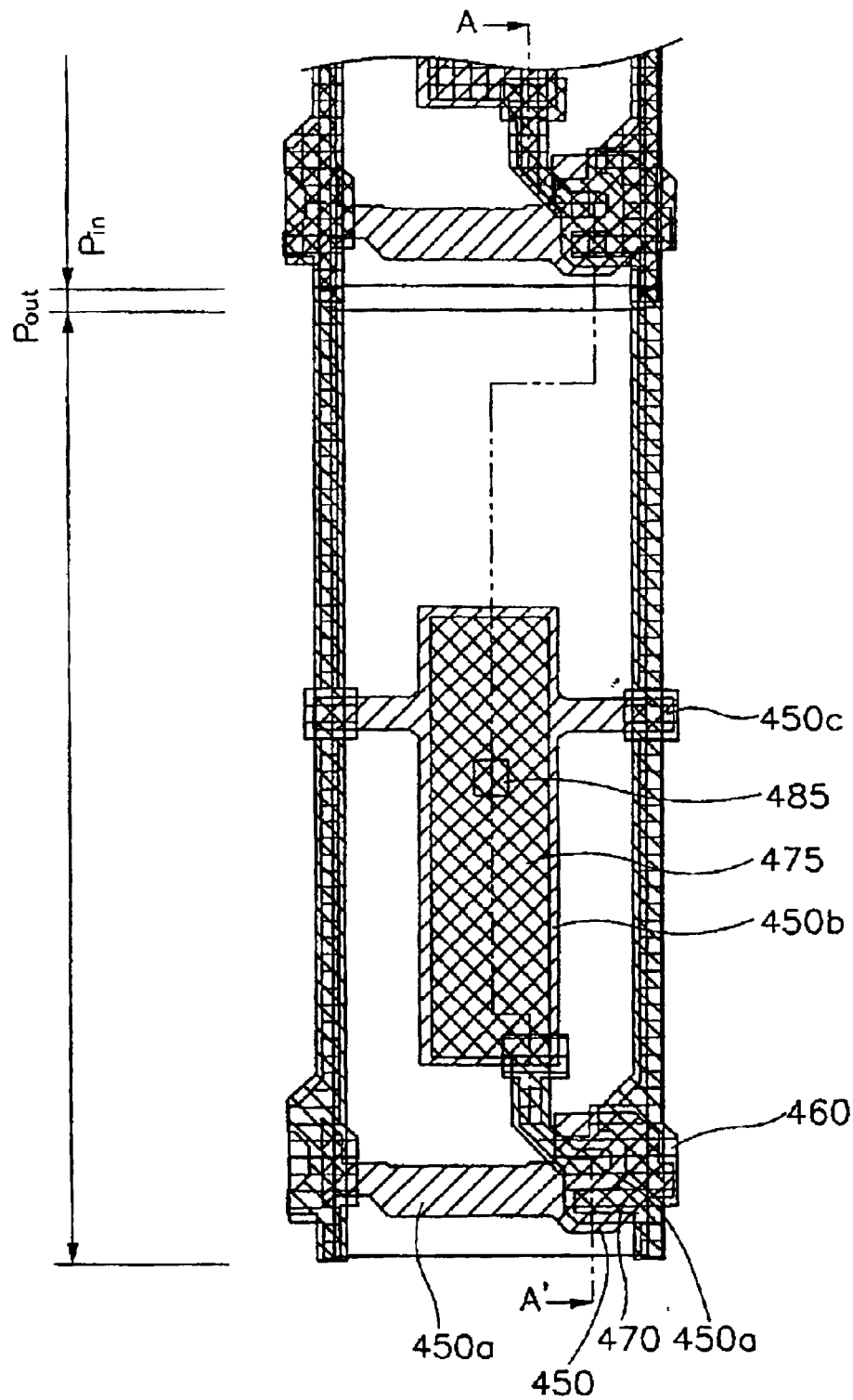
FIG. 7 is a plan view of a reflection type LCD having the reflection electrode according to a third embodiment of the present invention.
Figure 8:
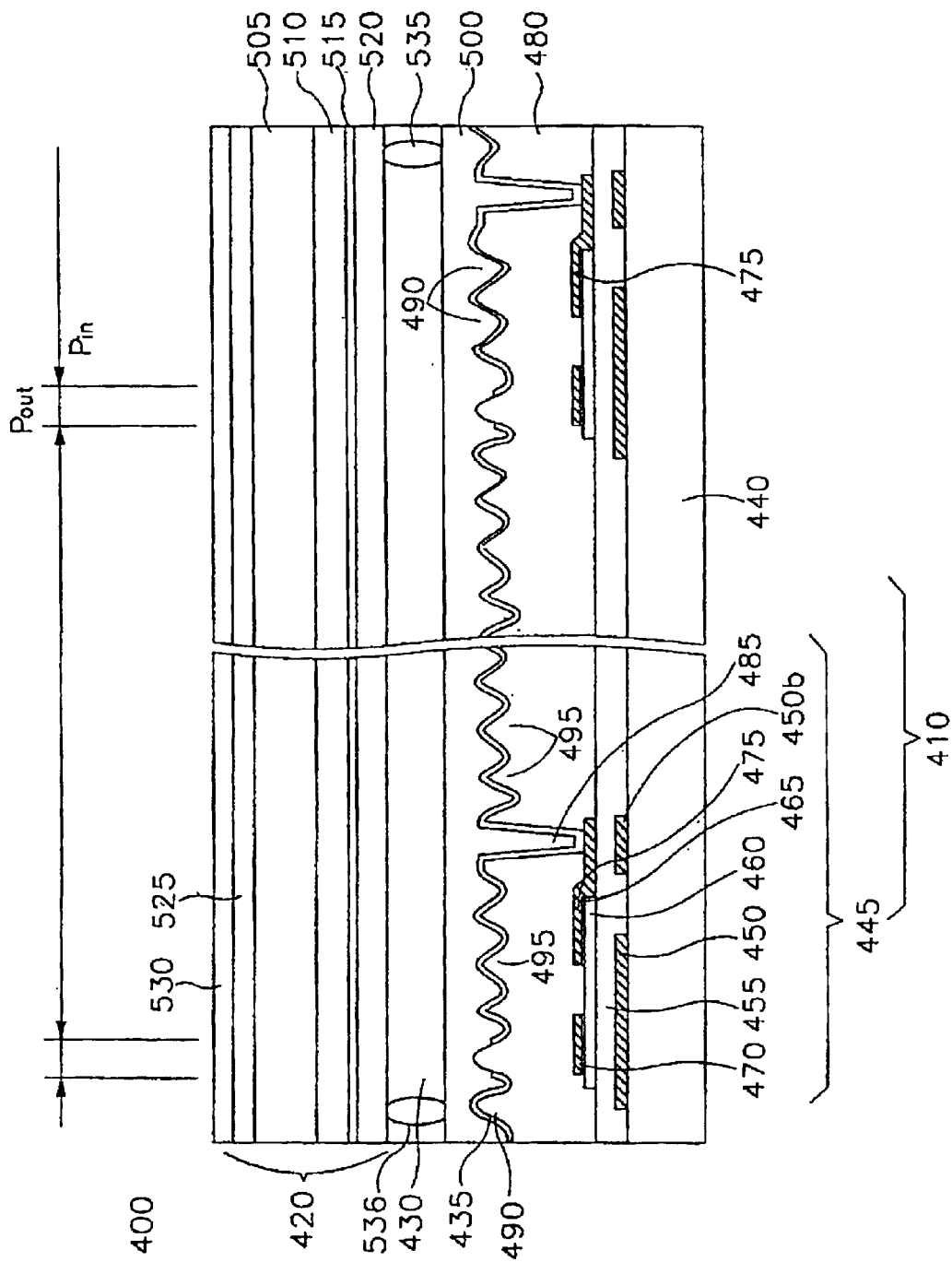
FIG. 8 is a schematic cross-sectional view taken along the line A–A' of FIG. 7.

FIG. 7 is a plan view of a reflection type LCD having the reflection electrode with prominences and recesses according to a third embodiment of the present invention, and FIG. 8 is a schematic cross-sectional view taken along the line A–A' of FIG. 7.

Referring to FIGS. 7 and 8, the reflection type LCD 400 includes a first substrate 410 on which a pixel is formed, a second substrate 420 facing the first substrate 410, a liquid crystal layer 430 sandwiched between the first substrate 410 and the second substrate 420, and a reflection electrode 435 that is a pixel electrode formed between the first substrate 410 and the liquid crystal layer 430.

The first substrate 410 includes a first insulating substrate 440 and a TFT 445 that is a switching device formed on the first insulating substrate 440.

The first insulating substrate 440 is formed of a non-conductive material, for example, glass or ceramic. The TFT 445 includes a gate electrode 450 branched from a gate line 450a, a gate insulating film 455, a semiconductor layer 460, an ohmic contact layer 465, a source electrode 470 and a drain electrode 475. Further, a storage electrode line 450c is formed in parallel with the gate line 450a below the drain electrode 475 and on the first insulating substrate 440. A storage electrode 450b is formed below the drain electrode 475.

The gate electrode 450 is branched from the gate line 450a on the first insulating substrate 440. Here, the gate electrode 450 has a double-layered structure in which a lower layer is made of Cr and an upper layer is made of Al.

A gate insulating film 455 of silicon nitride ($Si_xN_y$) is stacked on the entire surface of the first insulating substrate 440 on which the gate electrode 450, the storage electrode 450b and the storage electrode line 450c are formed. Then, a semiconductor layer 460 of amorphous silicon and an ohmic contact layer 465 of n+ amorphous silicon are formed on the gate insulating film 455 below which the gate electrode 450 is located.

The source electrode 470 and the drain electrode 475 are respectively formed on the ohmic contact layer 465 and the gate insulating film 455 while centering the gate electrode 450. The source electrode 470 and the drain electrode 475 are respectively formed of metal such as Ta, Mo, Ti, Cr, etc.

The photosensitive insulating film 480 is stacked on the first insulating substrate 440 on which the TFT 445 is formed. A plurality of first regions (dents or recesses) and second regions (protrusions or prominences) having a relative height difference are formed at a pixel region ($P_{in}$) of the photosensitive insulating film 480 so as to scatter the light.

Alternatively, the first and second regions formed at the pixel region ($P_{in}$) may be extended to a pixel external region ($P_{out}$) between the pixel regions.

A contact hole 485 is formed in the photosensitive insulating film 480 so as to expose a portion of the drain electrode 475 of the TFT 445.

On the inner surface of the contact hole 485 and the photosensitive insulating film 480, there is formed the reflection electrode 435. The reflection electrode 435 is connected through the contact hole 485 to the drain electrode 475, so that the TFT 445 is electrically connected to the reflection electrode 435.

A first orientation film 500 is stacked on the reflection electrode 435.

The second substrate 420 facing the first substrate 410 includes a second insulating substrate 505, a color filter 510, a common electrode 515, a second orientation film 520, a phase difference plate 525 and a polarizing plate 530.

The second insulating substrate 505 is formed of the same material as the first insulating substrate 440, for example, glass or ceramic. The phase difference plate 530 and the polarizing plate 530 are subsequently formed on the second insulating substrate 505. The color filter 510 is disposed at a lower portion of the second insulating substrate 505. The common electrode 515 and the second orientation film 520 are formed under the color filter 510 to form the second substrate 420. The second orientation film 520 functions to pre-tilt liquid crystal molecules of the liquid crystal layer 430 at a desired angle together with the first orientation film 500.

A plurality of spacers 535, 536 is interposed between the first substrate 410 and the second substrate 420 to form a desired space between the first substrate 410 and the second substrate 420. The liquid crystal layer 430 is introduced into the space between the first and second substrates 410, 420, whereby the reflection type LCD 400 capable of being applied to the present embodiment is formed.

Figure 9A:
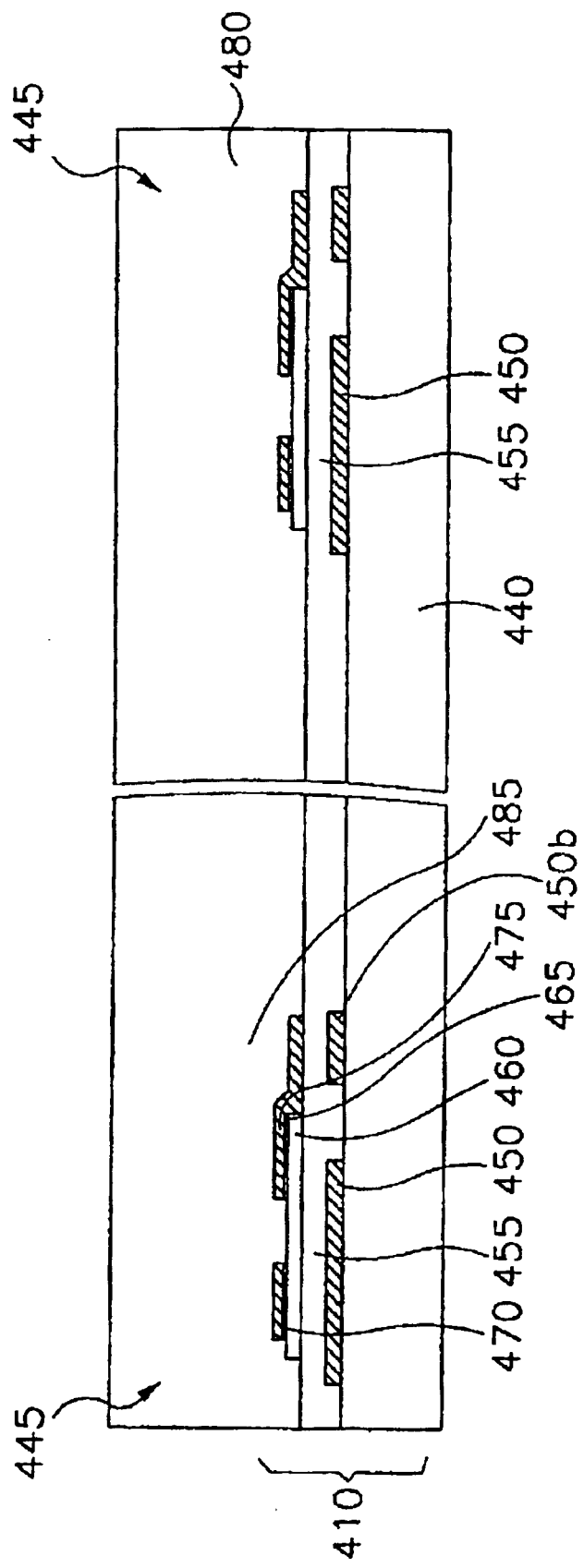

FIGS. 9A to 9C are cross-sectional views showing a method for manufacturing the LCD of FIGS. 7 and 8.

In FIGS. 9A to 9C, the same members as those in FIGS. 7 and 8 are designated with the same reference numerals.

Referring to FIGS. 7, 8 and 9A, first, the metallic material such as Ta, Ti, Mo, Al, Cr, Cu or W is deposited on the upper portion of the first insulating substrate 440 made of the insulating material such as glass or ceramic. Then, the deposited metal is patterned, whereby the gate line 450a, the gate electrode 450 branched from the gate line 450a, and the electrode line 450c including the storage electrode 450b are formed. At this time, the gate electrode 450 and the gate line 450a may be formed of an alloy of Al—Cu or an alloy of Al—Si—Cu.

Then, the silicon nitride is deposited on the entire surface of the first insulating substrate 440 including the gate electrode 450 by a plasma chemical vapor depositing method so as to form the gate insulating film 455.

On the gate insulting film 455, there are formed an amorphous silicon film and an in-situ-doped n+ amorphous silicon film by the plasma chemical vapor depositing method. Then, the stacked amorphous silicon film and the n+ amorphous silicon film are patterned, whereby the semiconductor layer 460 and the ohmic contact layer 465 are formed on a portion of the gate insulating film 455, below which the gate electrode 450 is located.

Continuously, on the first insulating substrate 440, on which the resultant structure are formed, there is formed a metal layer of the metallic material such as Ta, Ti, Mo, Al, Cr, Cu or W. Then, the stacked metal layer is patterned to form a source line (not shown) orthogonal to the gate line 450a, the source electrode 470 branched from the source line, and the drain electrode 475. Thereby, the TFT 445, including the gate electrode 450, the semiconductor layer 460, the ohmic contact layer 465, the source electrode 470 and the drain electrode 475, is completed. At this time, the gate insulating film 455 is interposed between the gate line and the source line to prevent the gate line from making contact with the source line.

On the first insulating substrate 440 on which the TFT 445 is formed, there is formed the photosensitive insulating film 480 to a thickness of about 1~3 μm by a spin coating method, whereby the first substrate 410 is completed. At this time, the photosensitive organic insulating film or the photosensitive inorganic insulating film can be used as the photosensitive insulating film. In this embodiment, an acrylic resin containing a photoactive compound (PAC) as the photosensitive organic insulating film may be used.

Referring to FIG. 9B, in order to form the contact hole 485, a first mask (not shown) for exposing a portion corresponding to the contact hole 485 is arranged over the photosensitive insulating film 480, and then a first exposing process is performed. A second mask 610 for exposing a portion corresponding to the dents is located thereon, and then a second exposing process is performed. After that, the developing process is performed, whereby the contact hole 485, for partially exposing the drain electrode 475 and the plurality of dents, is formed in the photosensitive insulating film 480.

Hereinafter, a process of forming the contact hole 485 in the photosensitive insulating film 480 and a process of forming the plurality of dents in the photosensitive insulating film 480 will be described in more detail.

First, in order to form the contact hole 485, the first mask having a pattern corresponding to the contact hole 485 is located over the photosensitive insulating film 480. Then, the portions of the photosensitive insulating film 480 corresponding to the source/drain electrodes 470, 475 are firstly exposed to the light by the full exposing process (wherein the exposing process is performed with a light amount for fully exposing the photosensitive insulating film 480).

Then, in order to form the plurality of dents or grooves 481, the second mask 610 for forming the micro-lens and having a pattern corresponding to the dents or grooves is located over the photosensitive insulating film 480.

The second mask 610 may have a pattern having a reversed shape with respect to the pattern shown in the drawings depending on the kind of the resist as that is used.

The photosensitive insulating film 480, except the portion corresponding to the contact hole 485, is secondly exposed to the light by a lens exposure process (wherein the exposing process is performed with a light amount suitable for forming the protrusions) using the second mask 610.

Then, the development process is performed, whereby as shown in FIG. 9B, the contact hole 485 for exposing the source/drain electrode 470, 475 is formed in the photosensitive insulating film 480. Further, the plurality of irregular dents (not shown) is formed at the surface of the photosensitive insulating film 480.

In the same manner as in Embodiments 1 and 2, in order to allow the uneven surface structure formed at the upper surface of the photosensitive insulating film 480 to have the uniform profile (i.e., prominences and recesses), the second amount of light passing through the second portion below which the metal pattern is located, i.e., the source electrode/drain electrode 470, 475, the gate electrode 450 or the storage electrode line 450b, is smaller than the first amount of light passing through the first portion below which the metal pattern is not located.

For this purpose, as shown in FIG. 9B, the space $d_2$ between the light shielding patterns 614 of the second portion corresponding to an upper portion of the metal pattern 450, 450b, 470, 475 in the light shielding patterns 612, 614 of the mask 610, including the light transmitting region 605, 615, for transmitting the incident light, and the light shielding pattern 612, 614, for reflecting the light, is smaller in a predetermined proportion than the space $d_1$ between the light shielding patterns 612 corresponding to an upper portion of the first portion below which the metal pattern 450, 450b, 470, 475 is not located. The proportion may be varied depending on the reflectivity of the metal pattern 450, 450b, 470, 475. Preferably, the proportion is about ½.

Alternatively, the light amount of the second portion may be different from the light amount of the first portion, that is, different from the method of FIG. 9B. In other words, the space $d_2$ between the light shielding patterns 614 of the second portion is the same as the space $d_1$ of the light shielding patterns 612 of the first portion and a half-tone mask is used, on which a semi-transparent film is additionally formed so as to reduce a transmitting amount of the incident light onto the surface of the light transmitting region 615 of the second portion. Then, the subsequent exposing process and the developing process are carried out in the same manner.

Referring to FIG. 9C, on the photosensitive insulating film 480 on which the plurality of dents are formed, as described above, there is deposited the metallic material having a high reflectivity such as Al, Ni, Cr, Ag, etc. Then, the deposited metal is patterned in the desired shape to form the reflection electrode 435. Subsequently, the resist is coated on the upper portion of the reflection electrode 435 and is then rubbed, whereby the first orientation film 500, for pre-tilting the liquid crystal molecules of the liquid crystal layer 430 at a predetermined angle, is formed. The reflection electrode 435 has the same surface profile as the surface of the photosensitive insulating film 480.

The reflection electrode 435 is divided into the first region 490 comprised of the plurality of dents formed on the dents 481 of the photosensitive insulating film 480 and the second portion 495 as a lens region comprised of the plurality of protrusions. At this time, the first region 490 comprised of the successive grooves (recesses) is relatively lower than the second region 495 comprised of the protrusions. Further, since the first region 490 encloses the second region 495, the reflection electrode 435 has a structure in that the second regions 495 are defined by the first regions 490 comprised of the successive grooves.

Figure 10:
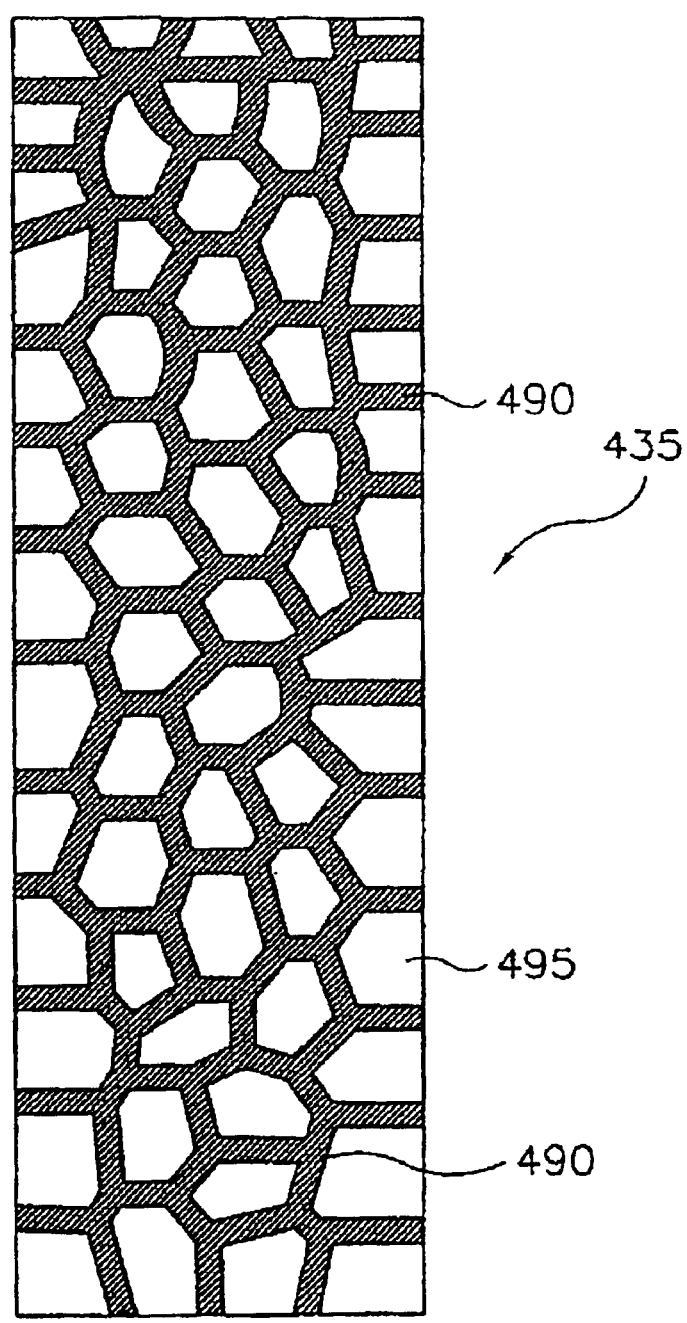
FIG. 10 is a plan view of a profile of the reflection electrode according to the second and third embodiment of the present invention.

FIG. 10 is a plan view of a profile of the reflection electrode according to the second and third embodiments of the present invention.

Referring to FIG. 10, shapes of the plurality of grooves 490 and protrusions 495 forming the reflection electrode 435 are decided according to the pattern of the mask for patterning the photosensitive insulating film located under the reflection electrode 435. That is, it can be noted that FIG. 10 shows a pattern shape of the reflection electrode 435 and, at the same time, shows a shape of the photosensitive insulating film under the reflection electrode 435 or of the pattern of the mask for patterning the photosensitive insulating film. In other words, the mask shown in FIG. 9B also has the light shielding pattern corresponding to the plurality of protrusions 495 and the light transmitting regions corresponding to the plurality of grooves 495, as shown in FIG. 10.

Figure 1:
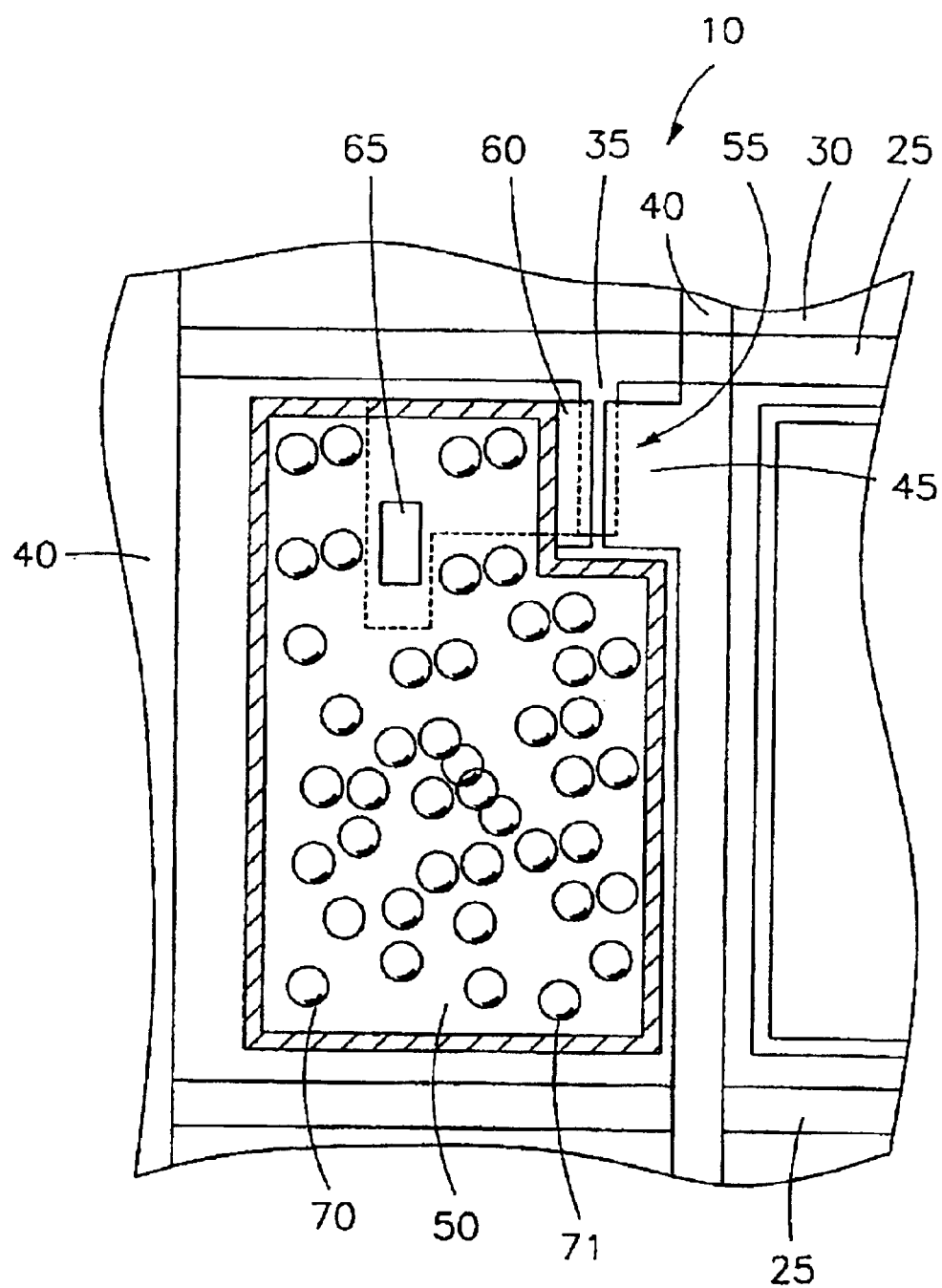
FIG. 1 is a partial plan view of a conventional reflection type LCD.
Figure 2:
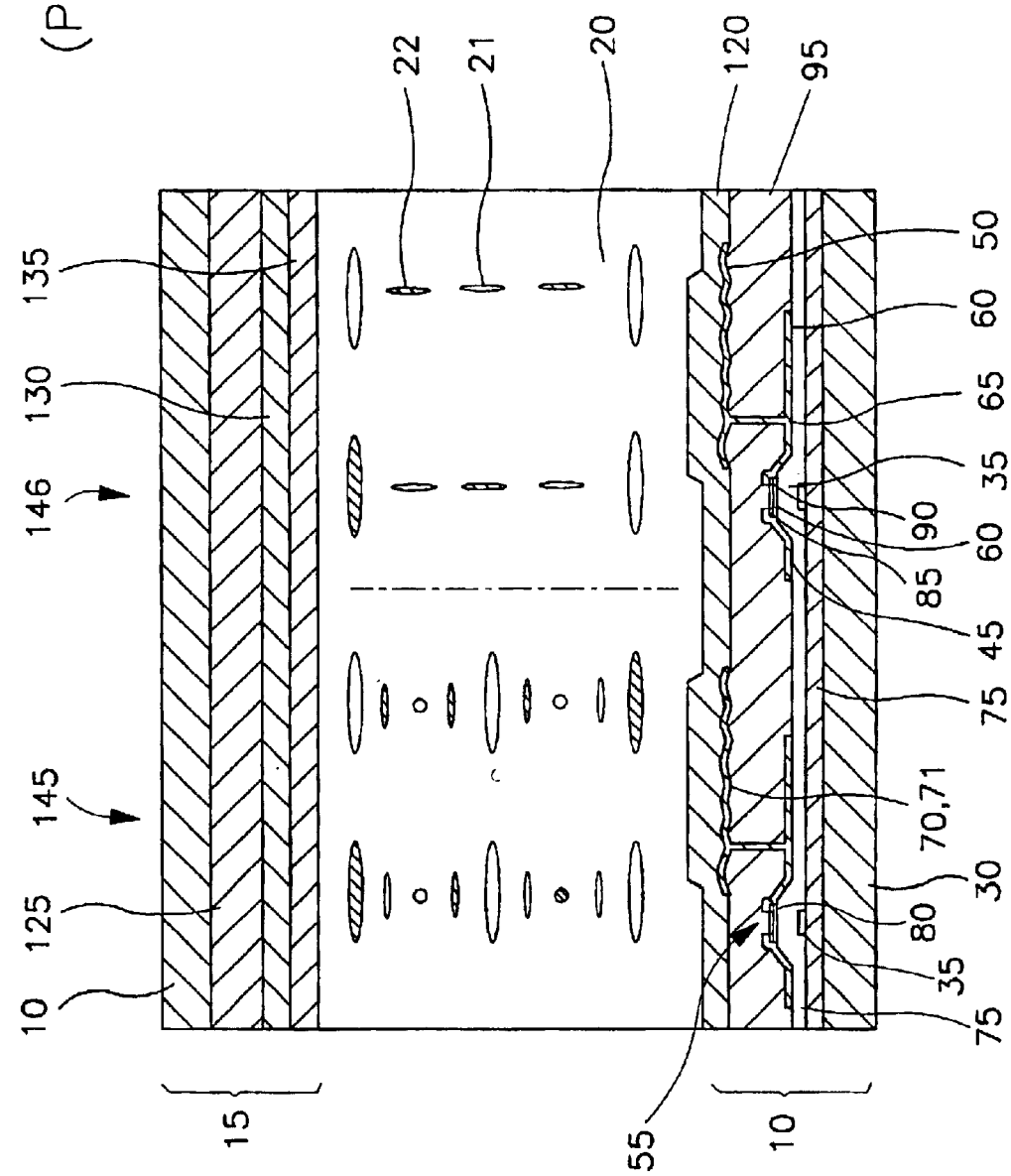
FIG. 2 is a cross-sectional view of the conventional reflection type LCD of FIG. 1.
Figure 3A:
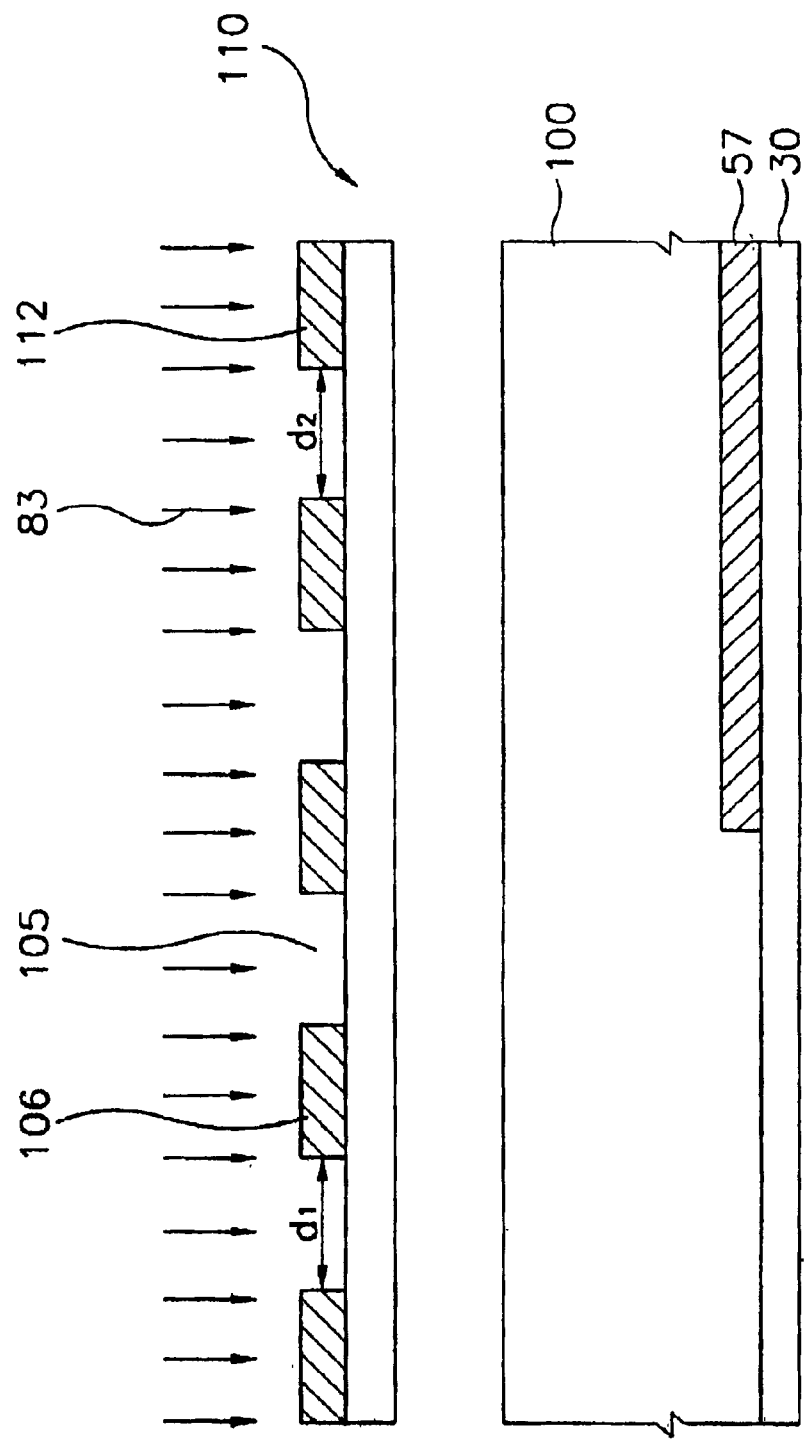
FIGS. 3A and 3B are cross-sectional views showing a method for forming an organic insulating film and a reflection electrode of the LCD of FIG. 2.
Figure 3B:
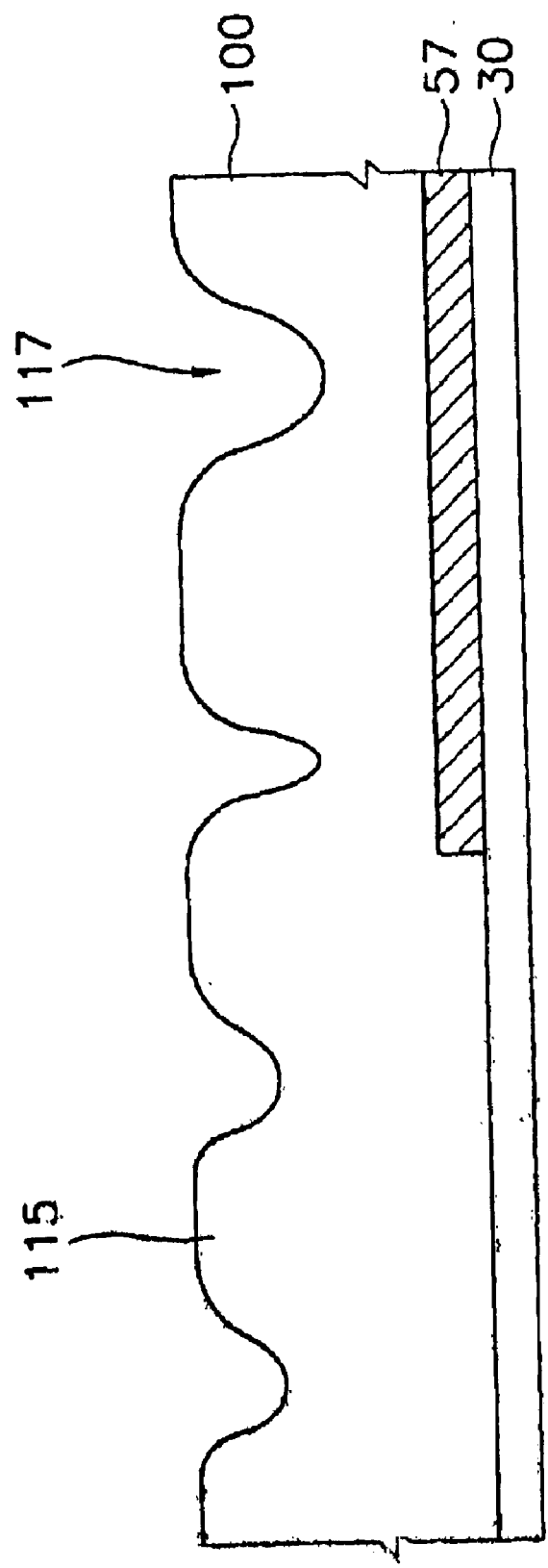
Figure 4:
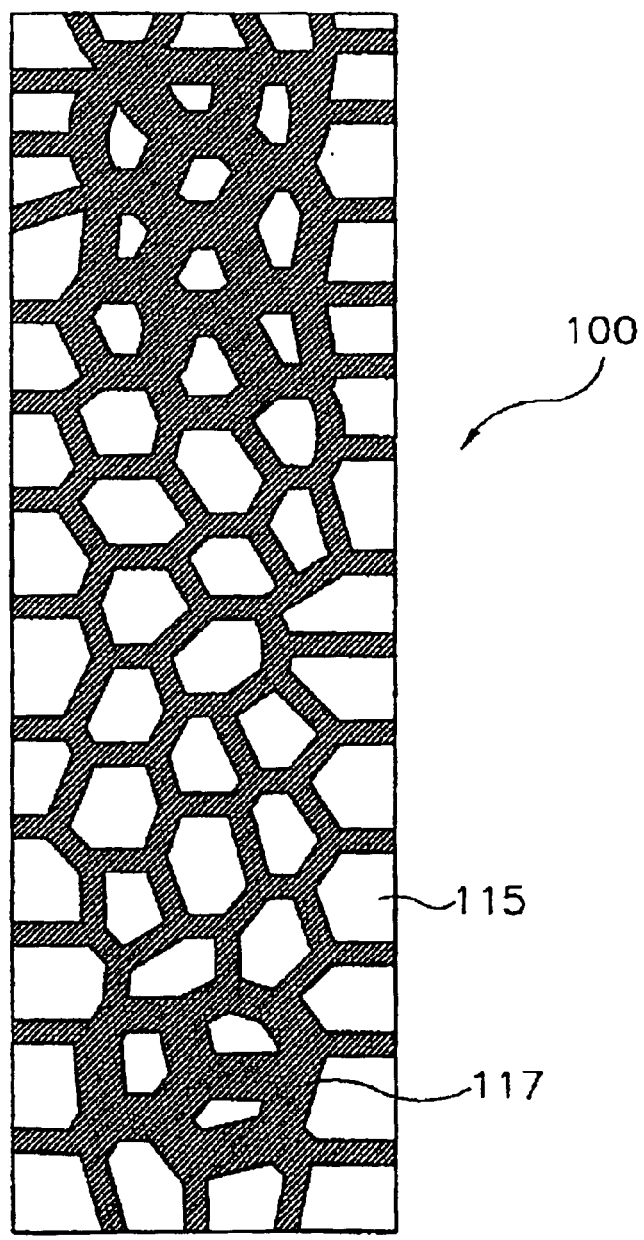
FIG. 4 is a plan view of the reflection electrode formed at a unit pixel region by the method of FIGS. 3A and 3B.

When comparing the reflection electrode of the embodiment of the present invention shown in FIG. 10 with the conventional reflection electrode shown in FIG. 4, the reflection electrode 435 according to the embodiment has the plurality of grooves and protrusions having the same depth regardless of the existence of the metal pattern at the lower portion thereof.

The plurality of grooves (the first region) that are relatively recessed have a width of about 1~5 μm. The successive grooves are arranged with a constant width in lateral direction.

The plurality of protrusions (the second region) that are relatively protruded have a size of about 2~10 μm. The plurality of protrusions may have various shapes such as an elliptical shape, a waxing crescent moon or waning moon shape, a cross-sectional shape of a concave lens, a track shape and a half-track shape, etc.

In addition, although it is not shown in the drawings, a crater-shaped groove may be further formed in each protrusion of the photosensitive insulating film 480 so as to further improve the reflectivity of the reflection electrode 435 formed on the photosensitive insulating film 480.

Figure 9D:
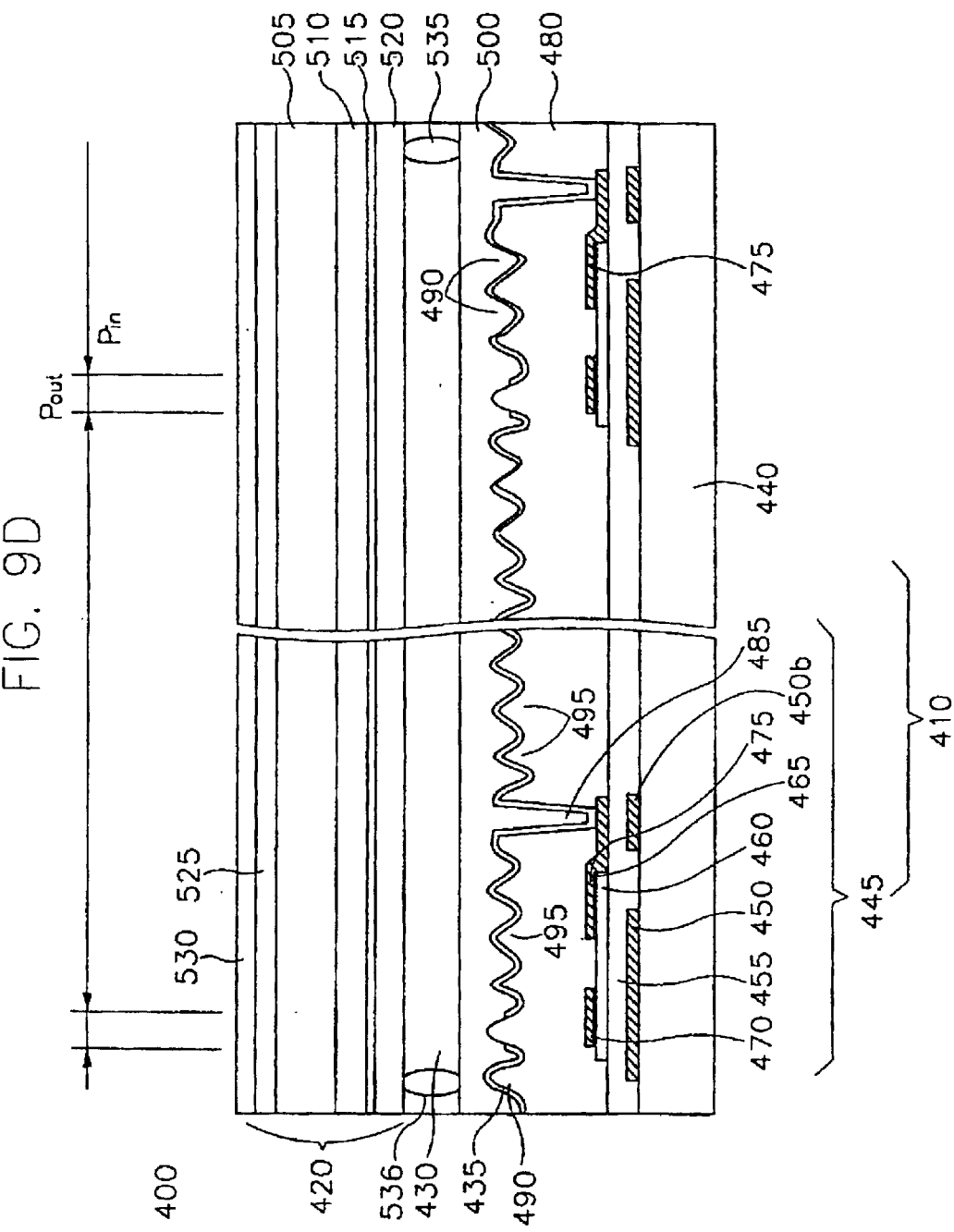

As shown in FIG. 9d, when the TFT 445 in the first substrate is formed, the second substrate 420 having a transparent electrode is formed to be opposite to the first substrate 410.

The second insulating substrate 505 is made of the same material as the first insulating substrate 440, for example, glass or ceramic. The color filter 510 is disposed at a lower portion of the second insulating substrate 505. The common electrode 515 and the second orientation film 520 are formed under the color filter 510 to form the second substrate 420. The phase difference plate 530 and the polarizing plate 530 are subsequently formed on the second insulating substrate 505.

Then, a liquid crystal layer is formed between the first substrate 410 and the second substrate 420, and finally the reflection type LCD is completed.

As described above, in the structure of the reflection electrode of the LCD according to the present invention, the first region enclosing the second region that functions as the micro-lens in a pixel has a uniform depth, thereby increasing the reflection efficiency.

According to the method for forming the photosensitive insulating film having an uneven surface, the dents or grooves have the same depth regardless of the existence of the metal pattern that is located below the photosensitive insulating film, and also the reflection electrode formed thereon has the dents and grooves having the same depth throughout the entire surface thereof, thereby uniformly improving the reflection efficiency throughout the entire surface area of a displaying region. Therefore, when the method of the present invention is applied to the reflection electrode having an uneven surface, the contrast and quality of an image is remarkably improved.

In addition, since the reflection electrode is formed using the improved exposing and developing process, the manufacturing time and cost are remarkably reduced.

Further, when forming the photosensitive insulating film prior to forming the reflection electrode, the grooves are formed at an external region of the pixel region in the same manner as in the pixel region. Therefore, there is not formed a height difference between the pixel region and the external region of the pixel region, thereby eliminating afterimage due to the light leakage or distortion phenomenon in the orientation of the liquid crystal molecules due to the height difference. After dispersion of the spacer, a uniform gap is formed between the first and second substrates.

Although the reflection electrode is described in reference with the reflection type LCD, the reflection electrode can also be applied to a reflection and transmission composite type LCD and other electronic display device. In this case, the reflectivity is equally improved throughout the entire displaying region.

While the present invention has been described in detail, it should be understood that various changes, substitutions and alterations can be made hereto without departing from the spirit and scope of the invention as defined by the appended claims.

What is claimed is:

1. A method for forming a photosensitive insulating film having a surface with prominences and recesses, the method comprising the steps of:
    forming the photosensitive insulating film on a substrate on which a first electrode having a reflection property is formed;
    exposing the photosensitive insulating film to a light; and
    developing the exposed photosensitive insulating film,
    wherein a first light amount of the light scanned between first patterns corresponding to an upper portion of the first electrode is smaller than a second light amount thereof scanned between second patterns corresponding to a portion other than the first electrode.

2. The method of claim 1, wherein the first electrode is formed of Al or Cr.

3. The method of claim 1, wherein the photoresist insulating film comprises a photosensitive inorganic insulating film or a photosensitive organic insulating film.

4. The method of claim 1, wherein the exposing step is performed by using a mask, a first space between first mask patterns of the mask corresponding to the first patterns of the photosensitive insulating film has a slit structure and the first space is smaller than a second space between second mask patterns of the mask corresponding to the second patterns of the photosensitive insulating film.

5. The method of claim 1, wherein the exposing step is performed by using a mask, and the mask is a half-tone mask having a semi-transparent film formed between the first mask patterns of the mask corresponding to the first patterns of the photosensitive insulating film so as to reduce a transmitting amount of the light.

6. A method for forming a reflection electrode, the method comprising steps of:
    forming a photosensitive insulating film on a substrate on which a first electrode having a reflection property is formed;
    exposing the photosensitive insulating film to a light;
    developing the exposed photosensitive insulating film to form a surface with prominences and recesses; and
    forming the reflection electrode having an uneven surface corresponding to the surface of the photosensitive insulating film on the photosensitive insulating film,
    wherein a first light amount of the light scanned between first patterns corresponding to an upper portion of the first electrode is smaller than a second light amount thereof scanned between second patterns corresponding to a portion other than the first electrode.

7. The method of claim 6, wherein the first electrode is a source electrode or a drain electrode of a thin film transistor, or comprises both of the source and drain electrodes.

8. The method of claim 7, wherein the first electrode further comprises a storage electrode.

9. The method of claim 6, wherein the exposing step is performed by using a mask, a first space between first mask patterns of the mask corresponding to the first patterns of the photosensitive insulating film has a slit structure and the first space is smaller than a second space between second mask patterns of the mask corresponding to the second patterns of the photosensitive insulating film.

10. The method of claim 6, wherein the exposing step is performed by using a mask, and the mask is a half-tone mask having a semi-transparent film formed between the first mask patterns of the mask corresponding to the first patterns of the photosensitive insulating film so as to reduce a transmitting amount of the light.

11. A method for manufacturing an LCD, the method comprising the steps of:
forming a photosensitive insulating film on a first substrate on which a first electrode having a reflection property is formed;
exposing the photosensitive insulating film to a light;
developing the exposed photosensitive insulating film to form a surface with prominences and recesses; and
forming the reflection electrode on the photosensitive insulating film;
forming a second substrate facing the first substrate and having a transparent electrode; and
forming a liquid crystal layer between the first and second substrates,
wherein a first light amount of the light scanned between first patterns corresponding to an upper portions of the first electrode is smaller than a second light amount thereof scanned between second patterns corresponding to a portion other than the first electrode.

12. The method of claim 11, wherein the exposing step is performed by using a mask, a first space between first mask patterns of the mask corresponding to the first patterns of the photosensitive insulating film has a slit structure and the first space is smaller than a second space between second mask patterns of the mask corresponding to the second patterns of the photosensitive insulating film.

13. The method of claim 11, wherein the exposing step is performed by using a mask, and the mask is a half-tone mask having a semi-transparent film formed between the first mask patterns of the mask corresponding to the first patterns of the photosensitive insulating film so as to reduce a transmitting amount of the light.

14. The method of claim 11, wherein the surface of the reflecting electrode comprises a first region and a second region, the first region having a groove shape that is positioned relatively lower than the second region, and the second region having a protrusion shape that is positioned relatively higher than the first region.

15. The method of claim 14, wherein the first regions define the second regions in a closed curve shape partially together with a boundary line of a pixel.

16. The method of claim 14, wherein the second region has two or more shapes selected from the group consisting of an elliptical shape, a waxing crescent moon shape, a waning moon shape, a concave lens shape, a track shape, a half-track shape and an extended concave lens shape.

17. The method of claim 14, wherein the first region has a width of about 1~5 $\mu$m, and the second region has a size of about 2~10 $\mu$m.

* * * * *